United States Patent
Jang

(10) Patent No.: US 12,466,397 B2
(45) Date of Patent: Nov. 11, 2025

(54) VEHICLE AND CONTROL METHOD THEREOF

(71) Applicants: Hyundai Motor Company, Seoul (KR); Kia Corporation, Seoul (KR)

(72) Inventor: Yonjun Jang, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 78 days.

(21) Appl. No.: 18/198,451

(22) Filed: May 17, 2023

(65) Prior Publication Data
US 2023/0398983 A1   Dec. 14, 2023

(30) Foreign Application Priority Data
Jun. 13, 2022   (KR) .......................... 10-2022-0071261

(51) Int. Cl.
*B60W 10/18*   (2012.01)
*B60W 10/20*   (2006.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/18163; B60W 2420/403; B60W 2420/408; B60W 2552/10; B60W 2554/4041; B60W 2554/4044; B60W 2554/4049; B60W 2710/18; B60W 2710/20; B60W 2720/106; B60W 2754/30; B60W 2554/4045; B60W 60/0016; B60W 60/00272; B60W 30/0956; B60W 60/00276; B60W 30/16; B60W 40/02;
(Continued)

(56) References Cited

U.S. PATENT DOCUMENTS

2020/0189596 A1* 6/2020 Kang ................. B60W 60/0011
2021/0387645 A1  12/2021 Kim et al.
2024/0174230 A1* 5/2024 Saito ................... B60W 30/143

FOREIGN PATENT DOCUMENTS

JP       2013126823 A  *  6/2013
KR    10-2021-0153998 A   12/2021

* cited by examiner

*Primary Examiner* — Peter D Nolan
*Assistant Examiner* — Demetra R Smith-Stewart
(74) *Attorney, Agent, or Firm* — Banner & Witcoff, Ltd.

(57) ABSTRACT

A vehicle according to one or more example embodiments includes a camera having an external field of view and acquire image data for detecting a target object in the external field of view of the camera, a radar having an external field of view from the vehicle and acquire radar data for detecting the target object in the external field of view of the radar, and a controller including at least one processor. The at least one processor may be configured to process the image data and the radar data to yield a processing result, and control, based on the processing result, at least one of a braking device or a steering device. The controller may be configured to detect the target object traveling in a lane adjacent to the vehicle, detect an obstacle preceding the target object, and perform acceleration control or deceleration control based on detecting acceleration or deceleration of the target object.

20 Claims, 11 Drawing Sheets

(51) Int. Cl.
*B60W 30/09* (2012.01)
*B60W 30/18* (2012.01)
*G01S 13/86* (2006.01)
*G01S 13/931* (2020.01)
*G06V 20/56* (2022.01)
*G06V 20/58* (2022.01)

(52) U.S. Cl.
CPC ..... *B60W 30/18163* (2013.01); *G01S 13/867* (2013.01); *G01S 13/931* (2013.01); *G06V 20/58* (2022.01); *G06V 20/588* (2022.01); *B60W 2420/403* (2013.01); *B60W 2420/408* (2024.01); *B60W 2552/10* (2020.02); *B60W 2554/4041* (2020.02); *B60W 2554/4044* (2020.02); *B60W 2554/4049* (2020.02); *B60W 2710/18* (2013.01); *B60W 2710/20* (2013.01); *B60W 2720/106* (2013.01); *B60W 2754/30* (2020.02); *G01S 2013/93185* (2020.01); *G06V 2201/08* (2022.01)

(58) Field of Classification Search
CPC ........... B60W 40/105; B60W 2520/10; B60W 2720/10; G01S 13/867; G01S 13/931; G01S 2013/93185; G01S 2013/9319; G06V 20/58; G06V 20/588; G06V 2201/08
See application file for complete search history.

VEHICLE AND CONTROL METHOD THEREOF

CROSS-REFERENCE TO RELATED APPLICATION(S)

This application claims the benefit of priority to Korean Patent Application No. 10-2022-0071261, filed on Jun. 13, 2022 in the Korean Intellectual Property Office, the disclosure of which is incorporated herein by reference.

TECHNICAL FIELD

The disclosure relates to a vehicle and a control method thereof, and more particularly, to a vehicle and control method for avoiding interference of a target vehicle.

BACKGROUND

Autonomous driving level 4, so-called highly autonomous driving, relies on autonomous driving systems for most of the driving control without driver intervention. The autonomous driving system may detect the surroundings of the vehicle via cameras, radar, and/or lidar, and avoid other vehicles and obstacles based on the detected information.

Such an autonomous driving system may control a vehicle based on a collision prediction time (e.g., time-to-collision (TTC)) associated with a target object in order to avoid collision with other vehicles.

Since vehicles in traffic are affected by one another, simple avoidance control may not be sufficient to completely eliminate the possibility of a collision. Therefore, it may be beneficial to predict the risk of collision by considering all situations beyond direct collision avoidance.

SUMMARY

An aspect of the disclosure is to provide an autonomous driving system that make it possible to experience defensive driving.

According to one or more example embodiments, a vehicle may include a camera having an external field of view and configured to acquire image data for detecting a target object in the external field of view of the camera, a radar having an external field of view from the vehicle and configured to acquire radar data for detecting the target object in the external field of view of the radar, and a controller. The controller may include at least one processor and be configured to process the image data and the radar data to yield a processing result, and control, based on the processing result, at least one of a braking device or a steering device. The controller may be further configured to detect the target object traveling in a lane adjacent to the vehicle, detect an obstacle preceding the target object, and perform acceleration control or deceleration control based on detecting acceleration or deceleration of the target object.

The controller may be further configured to determine a braking avoidance limit point of the target object relative to the obstacle, and perform the deceleration control in response to detecting acceleration of the target object after the target object reaches the braking avoidance limit point.

The controller may be further configured to perform the deceleration control for the vehicle to maintain at least a predetermined distance from the obstacle, and release, based on detecting the target object in a front field of view, the deceleration control.

The controller may be further configured to determine a braking avoidance limit point of the target object relative to the obstacle, and perform the acceleration control based on detecting deceleration of the target object after the target object reaches the braking avoidance limit point.

The controller may be further configured to perform the acceleration control to move the vehicle ahead of the target object, and release, based on detection of the target object in a rear field of view, the acceleration control.

The target object may be a first target object. The controller may be further configured to detect a second target object trailing the first target object in the lane adjacent to the vehicle, and perform the deceleration control based on detecting acceleration of the first target object and acceleration of the second target object.

The controller may be further configured to perform the deceleration control for the vehicle to maintain a constant distance from the obstacle, and release, based on detection of the first target object and the second target object in a front field of view, the deceleration control.

The target object may be a first target object. The controller may be further configured to detect a second target object trailing the first target object in the lane adjacent to the vehicle, and perform steering control based on detecting deceleration of the first target object and acceleration of the second target object.

The controller may be further configured to perform, based on detecting a change in a lateral direction of the second target object, steering control for the vehicle to move to the lane adjacent to the vehicle or to a lane opposite to the lane adjacent to the vehicle.

The controller may be further configured to perform, after the second target object reaches a braking avoidance limit point relative to the first target object, steering control.

According to one or more example embodiments, a method may include: detecting, by processor in a vehicle, a target object traveling in a lane adjacent to the vehicle, and an obstacle preceding the target object; and performing acceleration control or deceleration control based on detecting acceleration or deceleration of the target object.

The method may further include: determining a braking avoidance limit point of the target object relative to the obstacle; and performing the deceleration control based on detecting acceleration of the target object after the target object reaches the braking avoidance limit point.

The method may further include releasing, based on detecting the target object in a front field of view, the deceleration control. The deceleration control may be performed for the vehicle to maintain at least a predetermined distance from the obstacle.

The method may further include: determining a braking avoidance limit point of the target object relative to the obstacle; and performing the acceleration control based on detecting deceleration of the target object after the target object reaches the braking avoidance limit point.

The method may further include releasing, based on detecting the target object in a rear field of view, the acceleration control. The acceleration control may be performed to move ahead of the target object.

The target object may be a first target object. The method may further include: detecting a second target object trailing the first target object in the lane adjacent to the vehicle; and performing the deceleration control based on detecting acceleration of the first target object and acceleration of the second target object.

The method may further include releasing, based on detecting the first target object and the second target object in a front field of view, the deceleration control. The deceleration control may be performed for the vehicle to maintain a constant distance from the obstacle.

The target object may be a first target object. The method may further include: detecting a second target object trailing the first target object in the lane adjacent to the vehicle; and performing steering control based on detecting deceleration of the first target object and acceleration of the second target object.

Performing the steering control may include steering, based on detecting a change in a lateral direction of the second target object, the vehicle to move to the lane adjacent to the vehicle or to a lane opposite to the lane adjacent to the vehicle.

Performing the steering control may include steering after the second target object reaches a braking avoidance limit point relative to the first target object.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
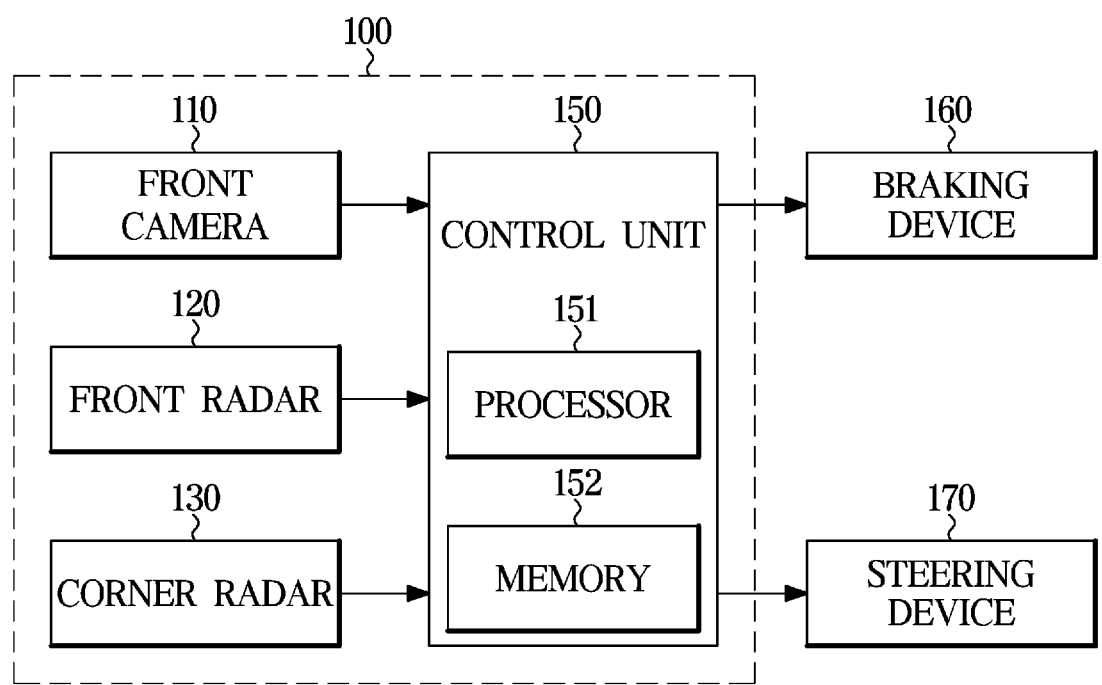
FIG. 1 is a control block diagram of a vehicle.

Throughout the specification, the same reference numerals refer to the same components. This specification does not describe all elements of the embodiments of the disclosure, and well-known descriptions in the art or repeated descriptions between the embodiments of the disclosure are omitted. The term "unit, module, member, or block" used in the specification may be implemented by software or hardware, and according to embodiments, it is also possible that a plurality of "units, modules, members, or blocks" are implemented as one component, or that one "part, module, member, or block" includes a plurality of components.

Throughout the specification, when a part is "connected" to another part, this includes a case of being directly connected as well as being connected indirectly, and indirect connection includes connecting through a wireless communication network.

Also, when a part is said to "comprise" a certain component, this means that other components may be further included instead of excluding other components unless specifically stated otherwise.

Throughout the specification, when one member is positioned "on" another member, this includes not only the case where one member abuts another member, but also the case where another member exists between the two members.

Terms such as "first" and "second" are used to distinguish one component from other components, and the component is not limited by the above-described terms.

A singular expression includes a plural expression unless the context clearly has an exception.

In each of steps, an identification code is used for convenience of description, and the identification code does not describe the order of each of the steps, and each of the steps may be performed differently from the specified order, unless a specific order is explicitly stated in the context.

Hereinafter, the principle and embodiments of the disclosure will be described with reference to accompanying drawings.

Figure 2:
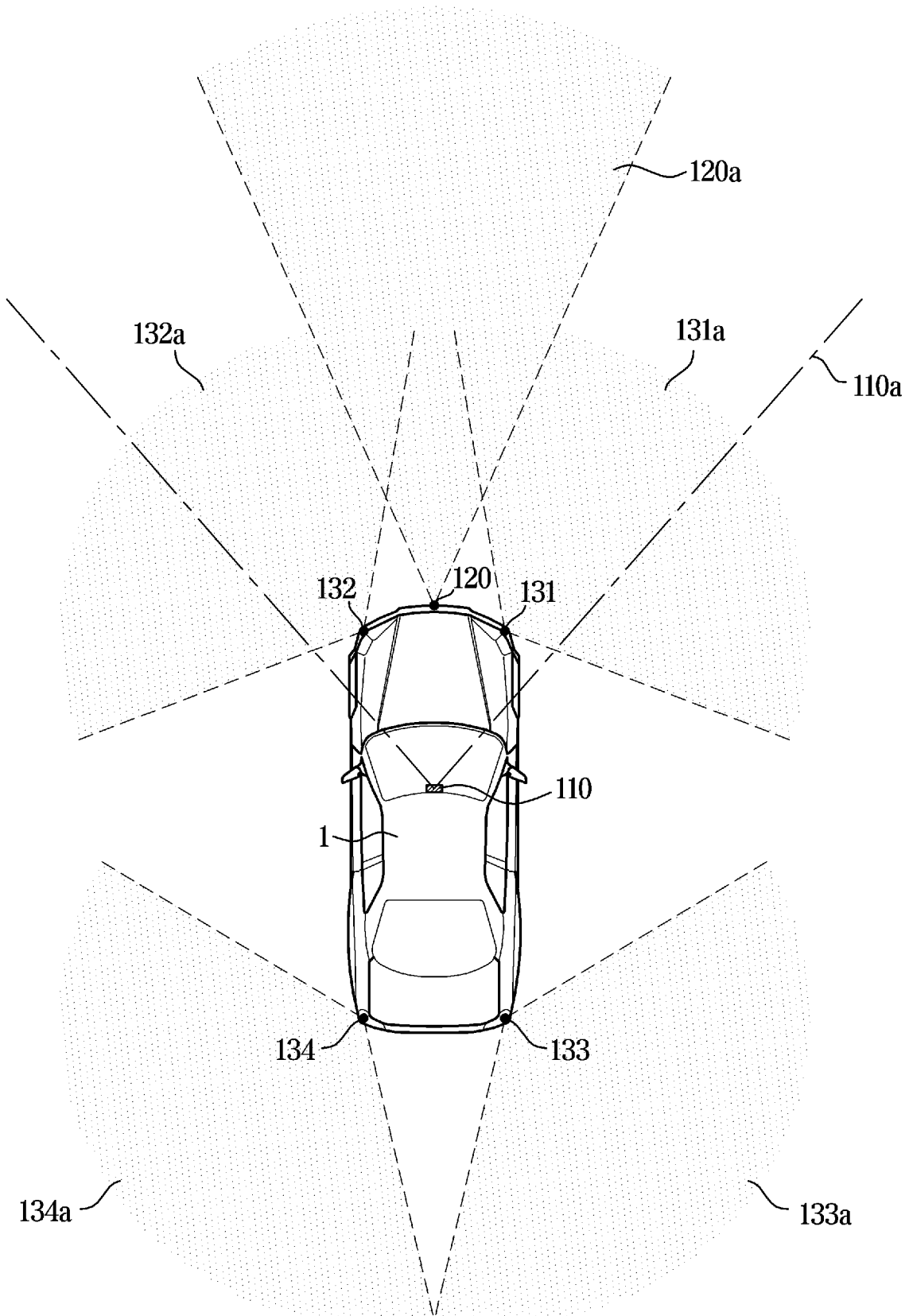
FIG. 2 illustrates detection areas of camera(s) and radar(s) included in a vehicle.

FIG. 1 is a control block diagram of a vehicle, and FIG. 2 illustrates detection areas of camera(s) and radar(s) included in the vehicle.

A vehicle 1 may include an autonomous driving system 100, a braking device 160, and a steering device 170.

The braking device 160 may temporarily brake the wheels of the vehicle 1 in response to the driver's braking intention input through the brake pedal and/or slip of the wheels and/or the data processing result of the autonomous driving system 100.

The steering device 170 may temporarily or continuously control the traveling direction of the vehicle 1 in response to the driver's steering intention through the steering wheel and/or the data processing result of the autonomous driving system 100.

The autonomous driving system 100 may assist a driver to operate (e.g., drive, brake, and steer) the vehicle 1. For example, the autonomous driving system 100 may detect the environment around the vehicle 1 (e.g., other vehicles, pedestrians, cyclists, lanes, road signs, etc.) and control the driving and/or braking and/or steering of the vehicle 1 in response to the detected environment. Hereinafter, the target object may include one or more of other vehicles, cyclists, and the like, which are objects that may collide with the driving vehicle 1 in the surrounding environment.

The controller 150 may transmit a driving control signal, a braking signal, and/or a steering signal to the braking device 160 and/or the steering device 170 through the vehicle communication network (NT).

The autonomous driving system 100 may provide various functions to the driver. For example, the autonomous driving system 100 may provide functions such as lane departure warning (LDW), lane keeping assist (LKA), high beam assist (HBA), automatic emergency braking (AEB), traffic sign recognition (TSR), smart cruise control (SCC), and/or blind spot detection (BSD).

The autonomous driving system 100 may include a front camera 110, a front radar 120, and a plurality of corner radars 130 (e.g., cameras 131, 132, 133 and 134).

The front camera 110 may be installed on the front windshield of the vehicle 1 in order to secure a forward field of view 110a (refer to FIG. 2) facing forward. The front camera 110 may point forward from the vehicle 1 to acquire forward image data of the vehicle 1. The front camera 110 may detect a target object moving in the forward field of view or a target object driving in adjacent lanes in the forward field of view. The forward image data of the vehicle 1 may include location information on at least one of other vehicles, pedestrians, cyclists, lanes, curbs, guard rails, street trees, and streetlights located in front of the vehicle 1.

One or more side cameras (not shown) may be additionally installed on the vehicle 1, and the side camera(s) may be installed on the B-pillar of the vehicle 1. The side camera may point sideward from the vehicle 1 to acquire sideward image data of the vehicle 1.

The front radar 120 may have a field of sensing 120a (e.g., field of view) facing forward from the vehicle 1. The front radar 120 may be installed, for example, on a grille or a bumper of the vehicle 1.

The front radar 120 may include a transmission antenna (or a transmission antenna array) radiating a transmission wave forward from the vehicle 1 and a reception antenna (or a reception antenna array) receiving the wave reflected by an obstacle.

The front radar 120 may acquire front radar data from the transmitted radio wave transmitted by the transmitting antenna and the reflected wave received by the receiving antenna.

The front radar data may include location information and speed degree of a target object (e.g., another vehicle or a pedestrian or cyclist, located in front of the vehicle 1).

The front radar 120 may calculate the relative distance to the obstacle based on the phase difference (or time difference) between the transmitted wave and the reflected wave and the relative speed of the obstacle based on the frequency difference between the transmitted wave and the reflected wave. The front radar 120 may transmit front radar data to the controller 150.

The plurality of corner radars 130 may include a first corner radar 131 installed on the front right corner of the vehicle 1, a second corner radar 132 installed on the front left corner of the vehicle 1, a third corner radar 133 installed on the rear right corner of the vehicle 1, and/or a fourth corner radar 134 installed on the rear left corner of the vehicle 1.

The first corner radar 131 may have a detection field of view 131a facing the front right side of the vehicle 1. The first corner radar 131 may be installed on the right side of the front bumper of the vehicle 1.

The second corner radar 132 may have a detection field of view 132a facing the front left side of the vehicle 1 and may be installed on the left side of the front bumper of the vehicle 1.

The third corner radar 133 may have a detection field of view 133a facing the rear right of the vehicle 1 and may be installed on the right side of the rear bumper of the vehicle 1.

The fourth corner radar 134 may have a detection field of view 134a facing the rear left of the vehicle 1 and may be installed on the left side of the rear bumper of the vehicle 1.

Each of the first, second, third, and fourth corner radars 131, 132, 133, and 134 may include a transmit antenna and a receive antenna.

The first, second, third, and fourth corner radars 131, 132, 133, and 134 may acquire first corner radar data, second corner radar data, third corner radar data, and fourth corner radar data, respectively.

The first corner radar data may include distance information and a speed degree with respect to a target object located on the right front side of the vehicle 1.

The second corner radar data may include distance information and a speed degree with respect to a target object located on the left front of the vehicle 1.

The third and fourth corner radar data may include distance information and speed information of objects located on the rear right side and rear left side of the vehicle 1.

The first, second, third, and fourth corner radars 131, 132, 133, and 134 may transmit first, second, third, and fourth corner radar data to the controller 150, respectively.

The controller 150 may process image data of the front camera 110, front radar data of the front radar 120, and corner radar data of the plurality of corner radars 130 and may generate a control signal for controlling the braking device 160 and/or the steering device 170.

The controller 150 may include an image signal processor 151 processing image data of the front camera 110 and/or a digital signal processor processing radar data of the radars 120 and 130 and/or a micro control unit (MCU) generating a braking signal.

After receiving image information (e.g., image data) from the front camera 110 in the autonomous driving mode, the controller 150 may perform image processing to recognize the lane dividing lines (e.g., pavement markings) of the road and identify the driving lane of the vehicle 1 based on the position information of the recognized lane dividing lines. The controller 150 may determine whether both lane dividing lines of the vehicle's driving lane are recognized, and control, upon determining that both lane dividing lines are recognized, the autonomous driving based on the recognized lane dividing lines.

In the case of performing a collision avoidance mode, the controller 150 may identify objects in the image based on the image information acquired by the front camera 110 and determine whether the target objects in the image are fixed obstacles or moving obstacles by comparing the information on the identified objects with object information stored in the memory 152.

The controller 150 may detect obstacles in front of the vehicle 1 (e.g., other vehicles, pedestrians, cyclists, curbstones, guardrails, street trees, streetlights, etc.) based on the image data of the front camera 110 and the front radar data of the front radar 120.

The controller 150 may obtain information on the target object based on lidar data of a lidar 140 in addition to the front camera 110.

The memory 152 may store programs (e.g., instructions) and/or data for processing image data, programs and/or data for processing radar data, and programs and/or data for the processor 151 to generate braking and/or warning signals.

The memory 152 may temporarily store image data received from the front camera 110 and/or radar data received from the radars 120 and 130, and processing results of the image data and/or radar data.

The memory 152 may be implemented with, but without being limited to, at least one of storage media including a non-volatile memory device such as cache, read only memory (ROM), programmable ROM (PROM), erasable programmable ROM (EPROM), electrically erasable programmable ROM (EEPROM), and flash memory, a volatile memory device such as random access memory (RAM), hard disk drive (HDD), or compact disc-ROM (CD-ROM).

Meanwhile, the disclosure implements defensive driving to prevent a collision situation in advance. To this end, the vehicle 1 may set an avoidance limit point to determine the possibility of collision between a target object and another obstacle and perform avoidance control based on the distance, between the target object and the obstacle, relative to the avoidance limit point. The avoidance limit point may correspond to the minimum distance for the target object to avoid collision with the obstacle.

In order to avoid obstacles, the target object may perform control based on the braking avoidance limit point indicative of the distance (e.g., minimum distance) required to avoid collision with the obstacle by braking and based on the steering avoidance limit point indicative of the distance (e.g., minimum distance) required to avoid the collision with the obstacle by steering.

Figure 3:
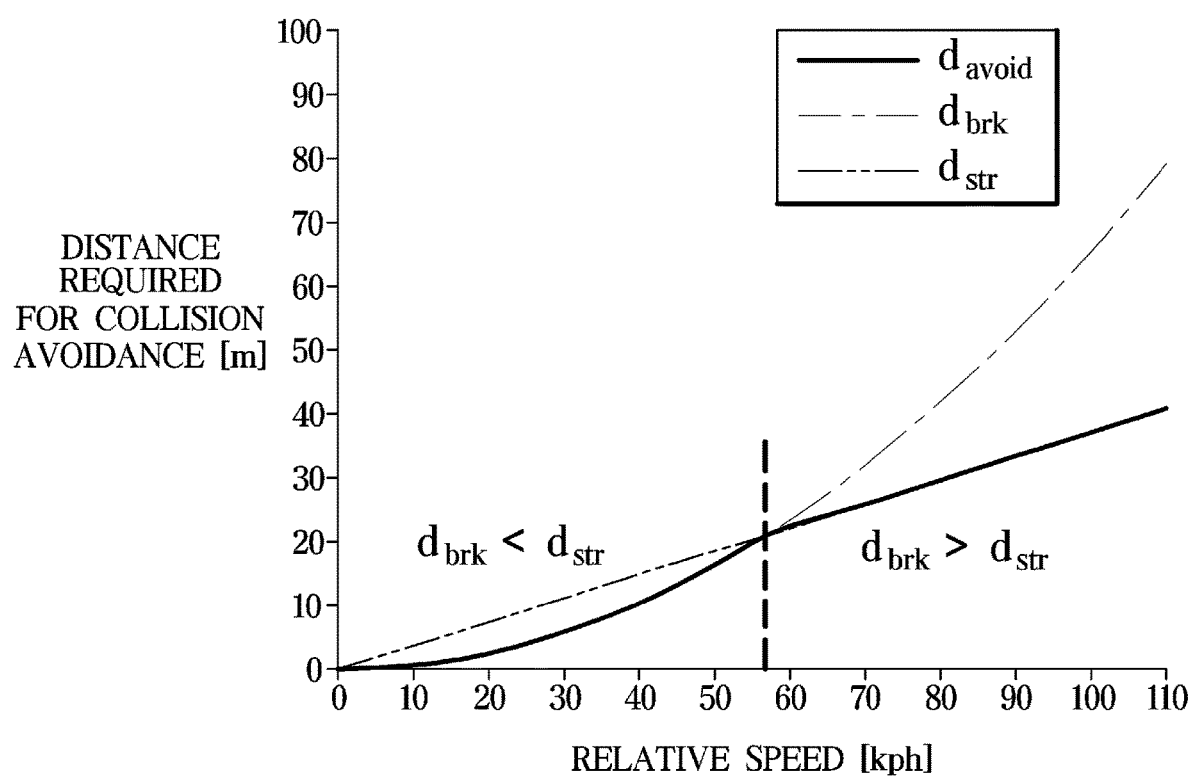
FIG. 3 is a diagram illustrating example avoidance limit points.

FIG. 3 is a diagram illustrating example avoidance limit points.

The braking avoidance limit point $d_{brk}$ may be calculated by Equation 1 below, and the steering avoidance limit point $d_{str}$ may be calculated by Equation 2 below, respectively.

$$d_{brk} = \frac{(v_{tgtS} - v_{tgt1})^2}{2(a_{tgtS} - a_{x,t})} \quad \text{Equation 1}$$

$$d_{str} = \sqrt{\frac{2d_y}{a_{y,t}}} (v_{tgtS} - v_{tgt1}) \quad \text{Equation 2}$$

($v_{tgtS}$: Initial velocity, $v_{tgt1}$ Final velocity, $a_{tgtS}$: Initial acceleration, $a_{x,t}$: Final acceleration, $d_y$: Distance to obstacle, $d_{y,t}$: Lateral acceleration)

For example, if it is determined that the target object may likely collide with an obstacle in front of (e.g., preceding) the target object (e.g., the target object is within a predetermined distance from an avoidance limit point), the target object may avoid collision with the obstacle through braking avoidance or steering avoidance. If the distance of the steering avoidance limit point is greater than the distance of the braking avoidance limit point (e.g., in the low speed region (about 10 to 50 km/h)), it can be estimated (e.g., anticipated) that the target object will likely choose the braking control rather than the steering control to avoid collision with the obstacle. In other words, in the low speed region, the braking avoidance limit point may be the (overall) avoidance limit point.

On the contrary, if the distance of the braking avoidance limit point is greater than the distance of the steering avoidance limit point (e.g., in the high-speed region (about 60 to 110 km/h)), it may be estimated (e.g., anticipated) that the target object will likely choose the steering control rather than the braking control to avoid collision with the obstacle.

The disclosure may predict the motion of a target object by taking into account the above-described characteristics and induce a method of defensive driving before the possibility of a direct collision of the vehicle 1 occurs based on the predicted motion of the target object.

Hereinafter, a description is made of the process for the vehicle 1 to perform defensive driving in various situations based on the above-described characteristics in detail.

Figure 4:
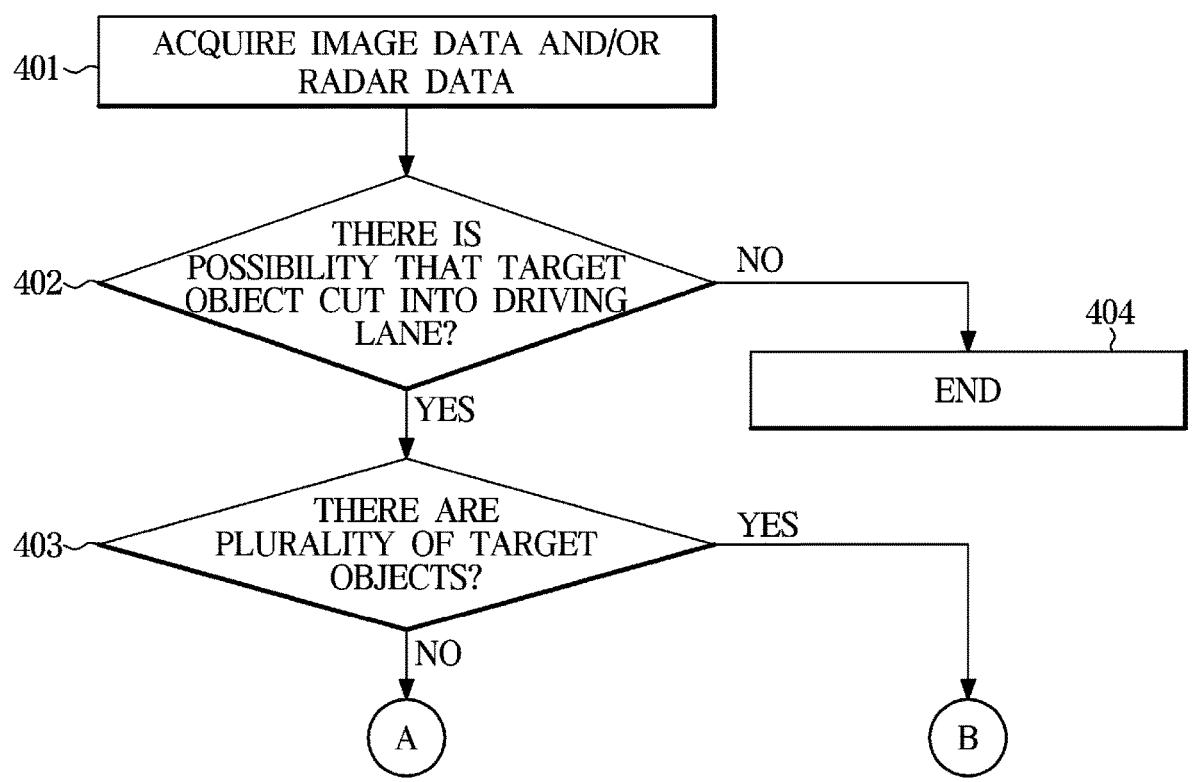
FIG. 4 is a flowchart illustrating a control method of a vehicle.
Figure 5:
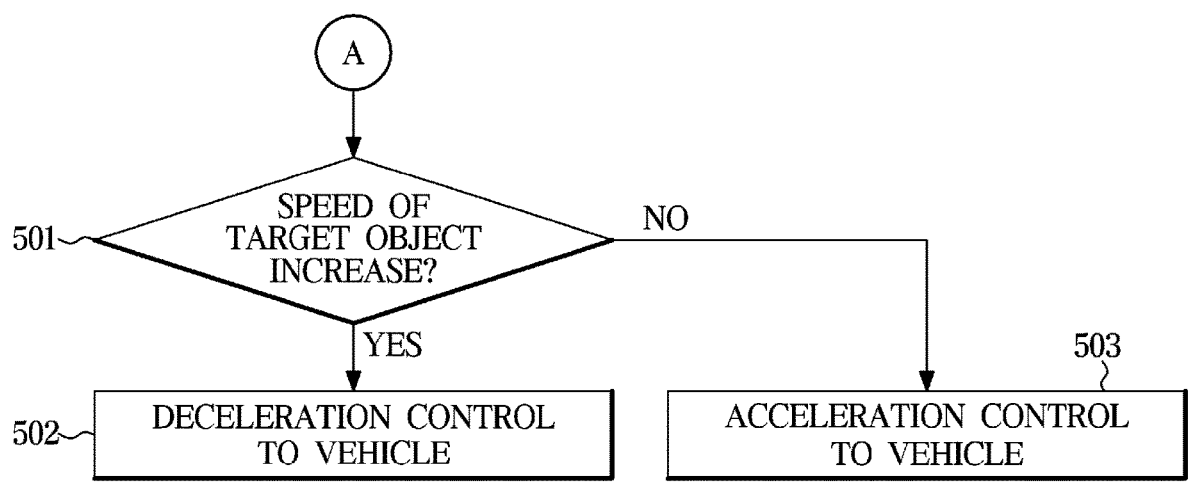
FIG. 5 is a flowchart illustrating a method for controlling a vehicle with respect to a single target object.
Figure 6:
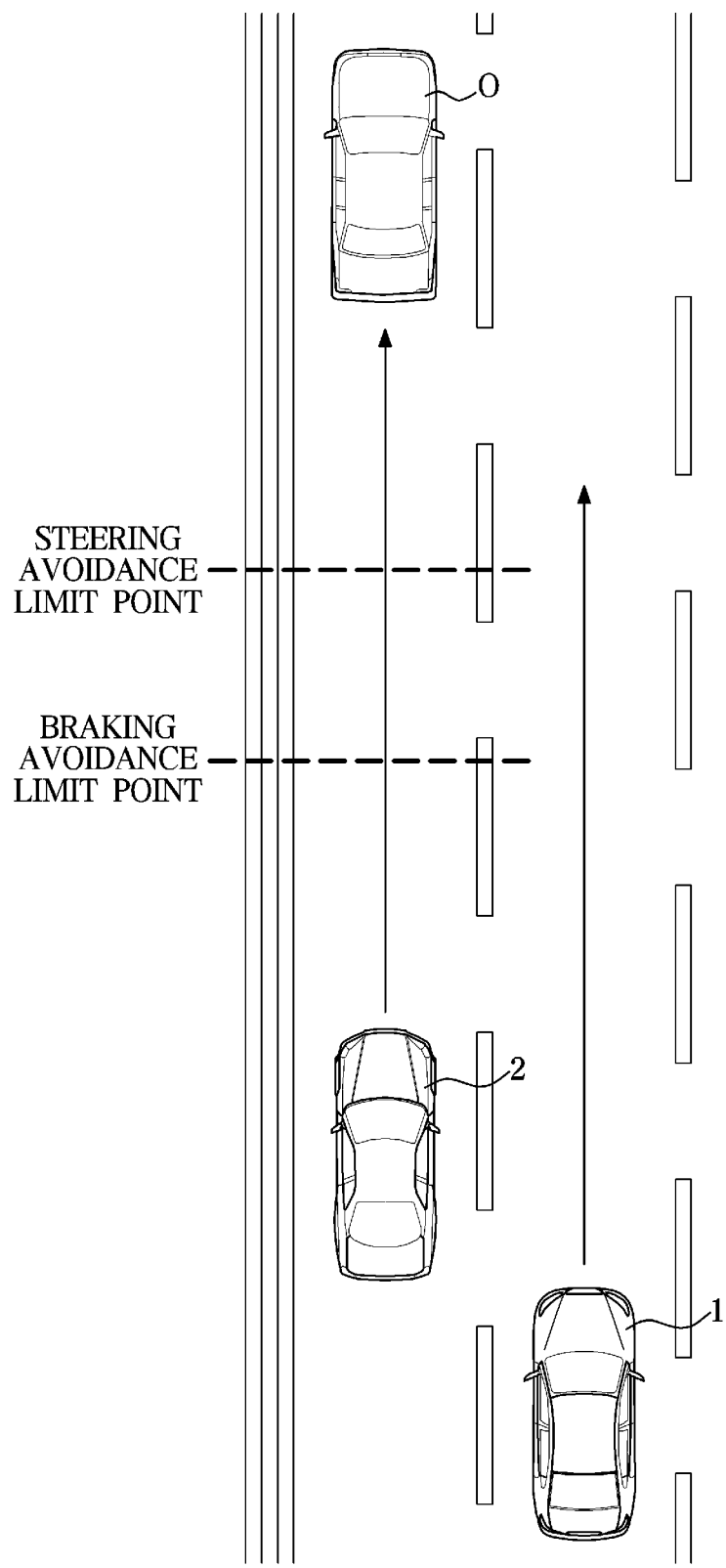
FIG. 6 shows an example traffic condition under which a vehicle may be controlled.
Figure 7:
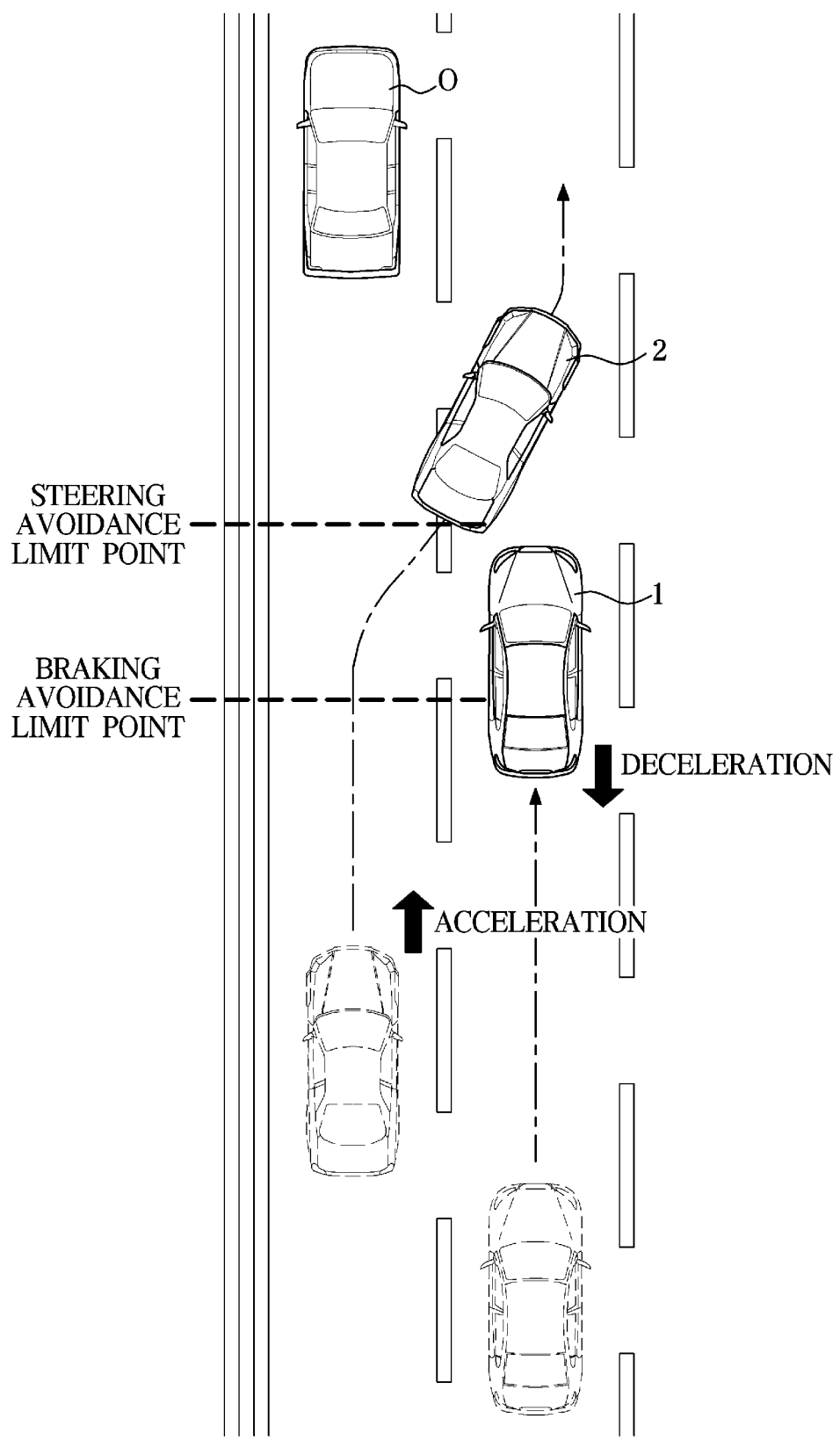
FIG. 7 shows an example traffic condition where a target object accelerates.
Figure 8:
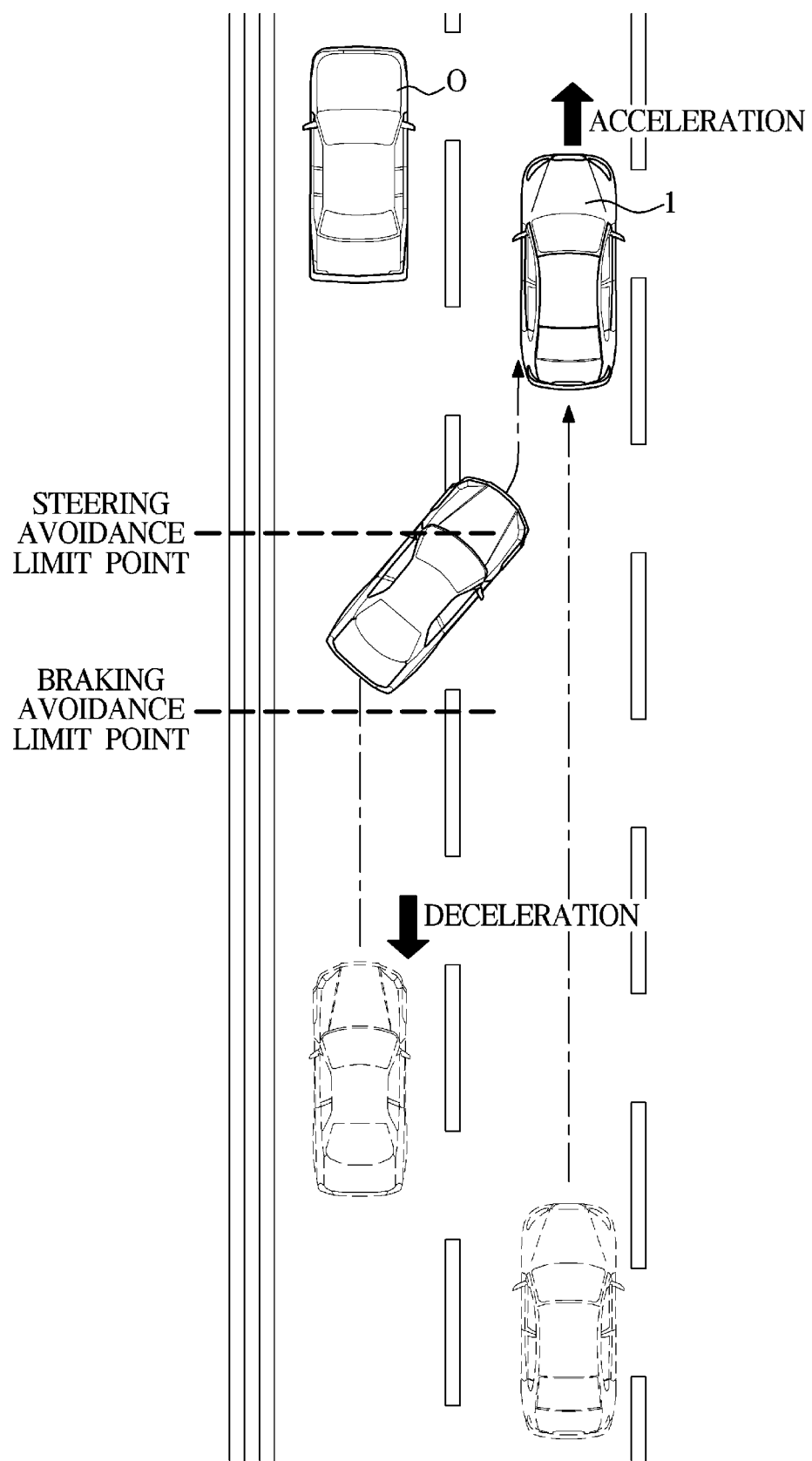
FIG. 8 shows an example traffic condition where a target object decelerates.

FIG. 4 is a flowchart illustrating a control method of a vehicle. FIG. 5 is a flowchart illustrating a method for controlling a vehicle with respect to a single target object. FIG. 6 shows an example traffic condition under which a vehicle may be controlled. FIG. 7 shows an example traffic condition where a target object accelerates. FIG. 8 shows an example traffic condition where a target object decelerates. The embodiment(s) of FIGS. 4 and 5 will be described with reference to FIGS. 6 to 8.

With reference to FIG. 4, the controller 150 may acquire image data and/or radar data at step 401. The controller 150 may process image data and/or radar data to detect a target object driving in the vicinity of the vehicle 1.

For example, with reference to FIG. 6, the controller 150 may detect the first target object 2 in the front side with respect to the vehicle 1 and the obstacle O preceding the first target object 2. Here, the obstacle O may be a stationary object or a moving object having a risk of collision with the first target object 2.

Next, the controller 150 may determine at step 402 whether there is a possibility (e.g., above a threshold value) that the target object 2 will cut into the driving lane of the vehicle 1 by obtaining the distance between the vehicle 1 and the first target object 2, the distance between the first target object 2 and the obstacle O, and/or the speed of the first target object 2.

Furthermore, the controller 150 may acquire (e.g., determine) a braking avoidance limit point and a steering avoidance limit point of the target object 2 relative to the obstacle O in order to determine the possibility of cut-in of the target object 2. The controller 150 may determine that the target object 2 will attempt to change the lane in response to the target object 2 falling within a predetermined distance from the braking avoidance limit point or in response to the front of the target object 2 reaching the braking avoidance limit point.

Meanwhile, the controller 150 may determine at step 403 whether there are a plurality of objects to perform the avoidance control in different manners for the case of a single target object and the case of a plurality of objects. First, the avoidance control for the case of a single target object will be described with reference to FIG. 5.

With reference to FIG. 7, in the case of reaching the braking avoidance limit point relative to the obstacle O and accelerating, the target object 2 may be expected to perform steering avoidance to avoid the obstacle O. Accordingly, in response to the target object 2 reaching the braking avoidance limit point and the speed of the target object 2 increasing (e.g., acceleration is sensed), the controller 150 may estimate (e.g., anticipate) lane change of the target object 2 and perform, at step 502, deceleration control in order to facilitate the target object 2 overtaking the vehicle 1. Here, the deceleration control may be released immediately after (or sometime after) the target object 2 changes the lane. In the situation as shown in FIG. 7, the vehicle 1 may be controlled to decelerate to facilitate the target object 2 to change the lane. Also, after the target object 2 completes the lane change, the vehicle 1 may release the deceleration control and travel at the same speed as before.

With reference to FIG. 8, in the case of reaching the braking avoidance limit point relative to the obstacle O and decelerating, the target object 2 may be expected to perform braking avoidance rather than steering avoidance to avoid the obstacle O. Accordingly, in response to the target object 2 reaching the braking avoidance limit point and the speed of the target object 2 decreasing (deceleration is sensed), the controller 150 may perform, at step 503, acceleration control in order for the vehicle 1 to move ahead of the target object 2. Here, the acceleration control may be released upon detection of the target object 2 in the rearward field of view of the vehicle 1. In the situation as shown in FIG. 8, after the vehicle 1 completes the lane change, the acceleration control may be released to drive at the same speed as before.

The controller 150 may detect a target object 2 and an obstacle O preceding the target object 2 traveling in a lane adjacent to the vehicle 1 and perform acceleration or deceleration control based on the detection of acceleration or deceleration of the target object 2. For example, the vehicle 1 may detect the acceleration of the target object 2 in the case where the target object 2 attempts to avoid the obstacle O by performing steering avoidance. In this case, the controller 150 may perform deceleration control to the vehicle 1. Also, the vehicle 1 may detect the deceleration of the target object 2 in the case where the target object 2 attempts to avoid the obstacle O by performing braking avoidance. In this case, the controller 150 may perform acceleration control to the vehicle 1.

Hereinabove, the description has been made of the case where a single target object attempting to avoid the obstacle O is detected. Hereinafter, a description is made of the case where a plurality of objects attempting to avoid an obstacle O are detected with reference to FIGS. 9 to 11.

Figure 9:
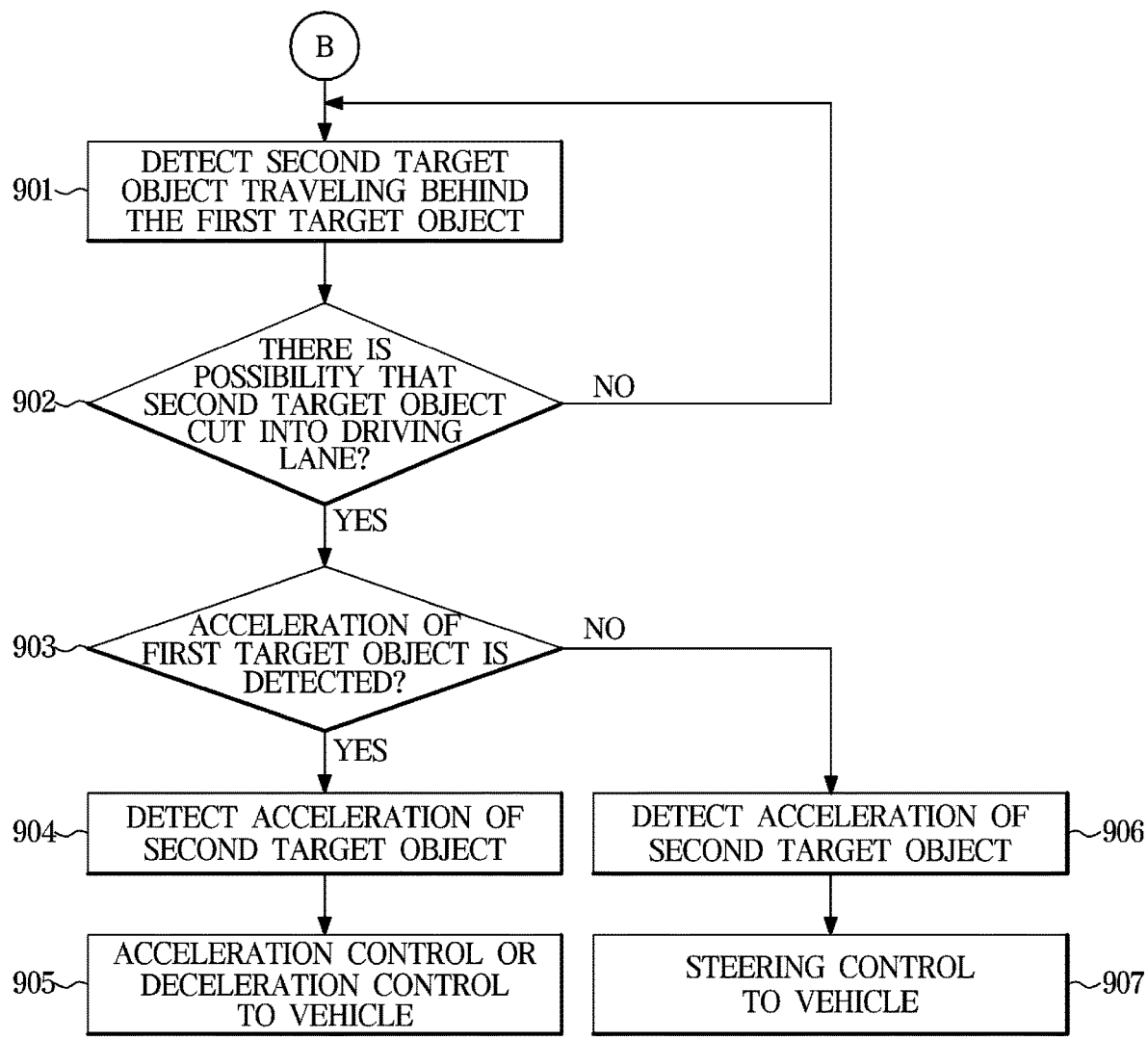
FIG. 9 is a flowchart illustrating a method for controlling a vehicle with respective to a plurality of objects.
Figure 10:
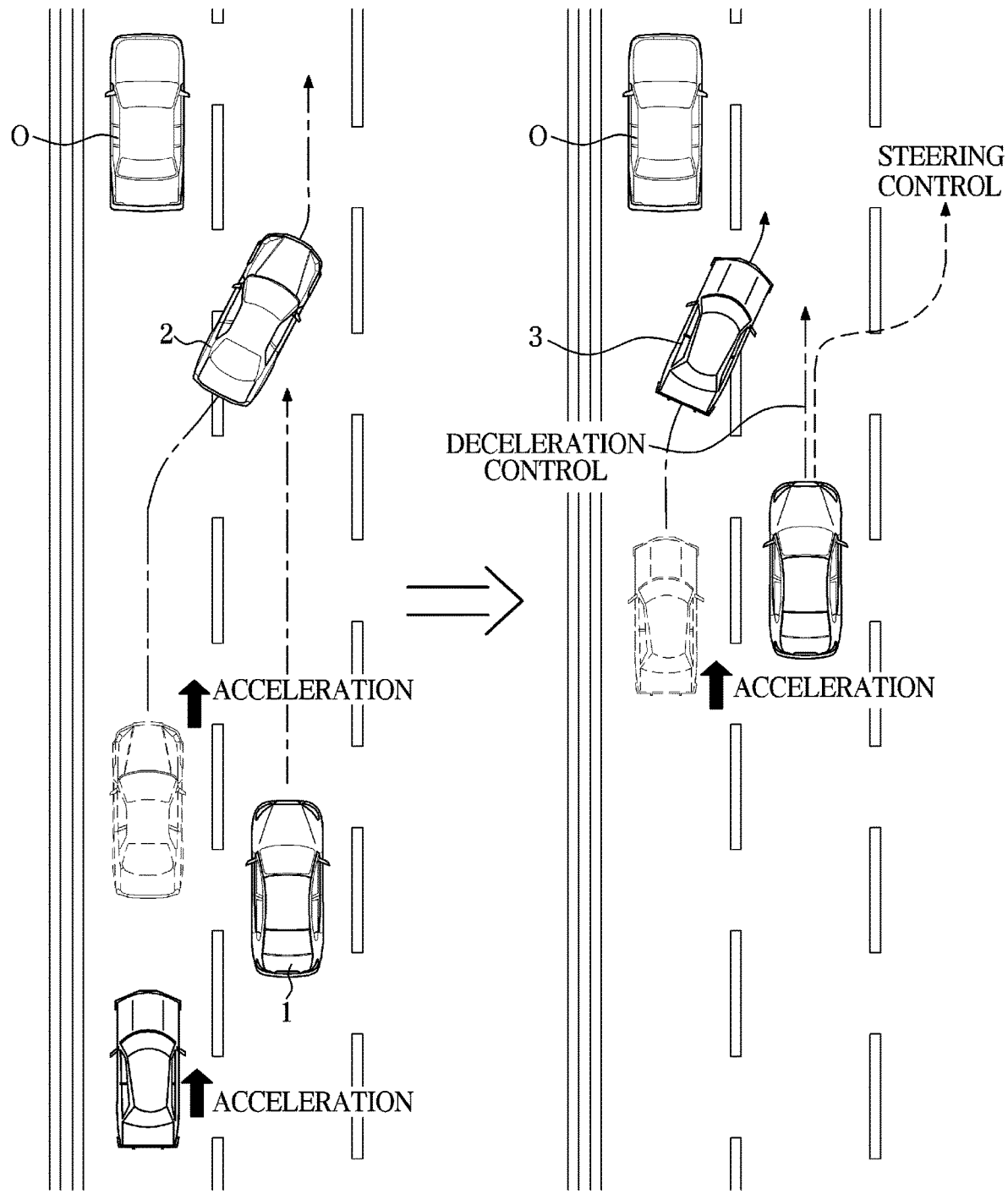
FIG. 10 shows an example traffic condition where a first target object among a plurality of objects accelerates.
Figure 11:
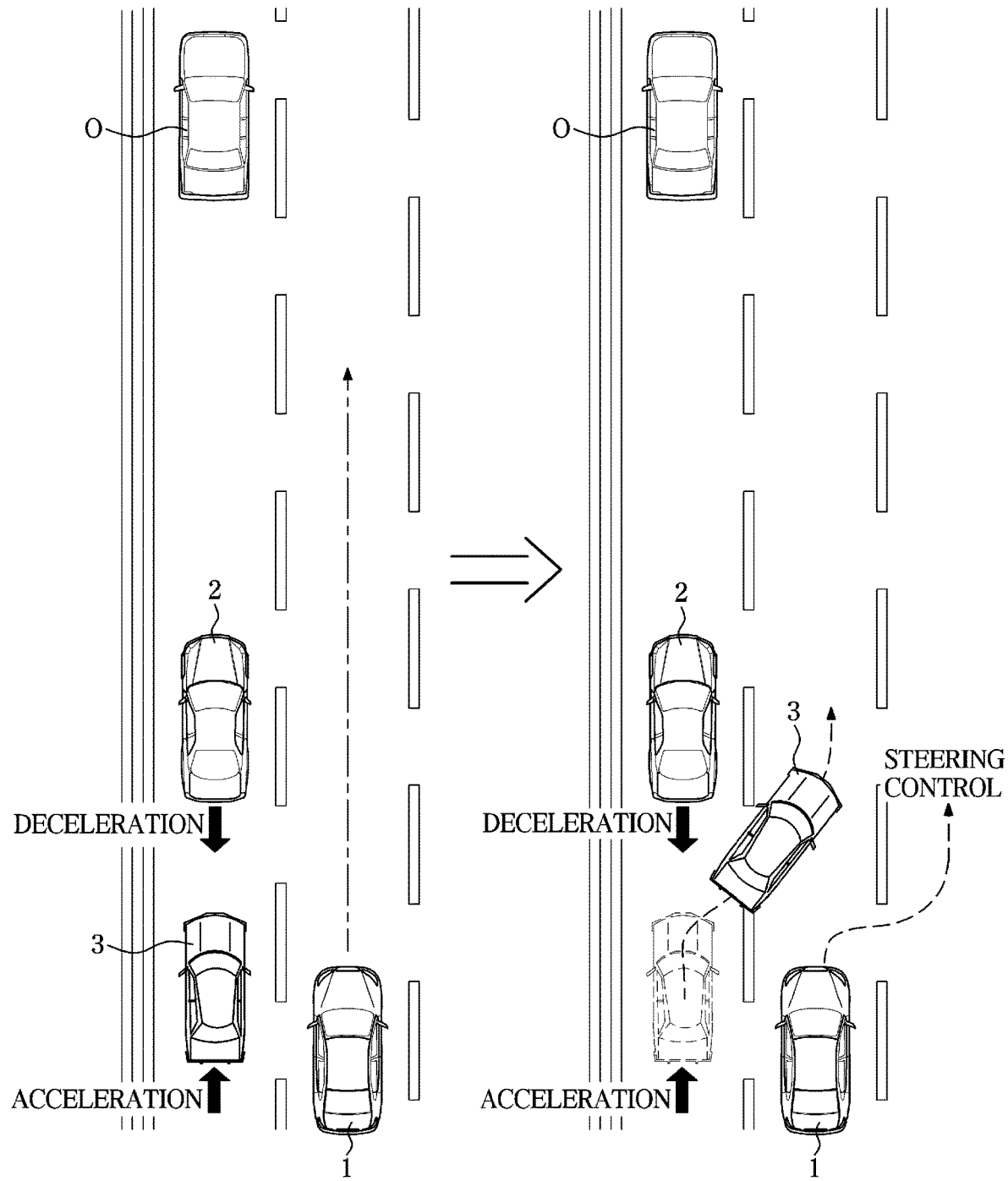
FIG. 11 shows an example traffic condition where a first target object among a plurality of objects decelerates.

FIG. 9 is a flowchart illustrating a method for controlling a vehicle with respective to a plurality of objects. FIG. 10 shows an example traffic condition where a first target object among a plurality of objects accelerates. FIG. 11 shows an example traffic condition where a first target object among a plurality of target objects decelerates.

The controller 150 may detect the first target object 2 in the front side with respect to the vehicle 1 and the obstacle O preceding the first target object 2. The controller 150 may detect, at step 901, a second target object 3 traveling behind (e.g., trailing) the first target object 2. Here, the obstacle O may be a stationary object or a moving object having a risk of collision with the first target object 2.

The controller 150 may determine at step 902 whether there is a possibility that the target object 2 will cut into the driving lane of the vehicle 1 by obtaining the distance between the vehicle 1 and the first target object 2, the distance between the first target object 2 and the obstacle O, the distance between the first target object 2 and the second target object 3, and/or the speeds of the first and second target objects 2 and 3.

Furthermore, the controller 150 may acquire (e.g., determine) a braking avoidance limit point and a steering avoidance limit point of the target object 2 relative to the obstacle O in order to determine the possibility of cut-in of the target object 2. The controller 150 may determine that the target object 2 will attempt to change the lane in response to the target object 2 falling within a predetermined distance from the braking avoidance limit point or in response to the front of the target object 2 reaching the braking avoidance limit point.

In the situation as shown in FIG. 10, upon simultaneous detection of the acceleration of the first target object 2 at step 903 and the acceleration of the second target object 3 at step 904, the controller 150 may control, at step 905, the vehicle 1 to perform deceleration. In this case, the controller 150 may avoid a collision with the second target object 3 by performing, at step 905, steering control rather than performing deceleration control. The vehicle 1 may decelerate to a speed that allows avoiding collision with the second target object 3 or, in the case where it is difficult to avoid a collision even with deceleration, change the lane to secure a lane in which the target object 2 can move.

In addition, after performing deceleration control or steering control at step 905, the controller 150 may perform deceleration control in order for the vehicle 1 to maintain a predetermined distance or longer from the obstacle O and release, after detecting the first target object 2 and the second target object 3 in the front field of view, the deceleration control in order for the vehicle 1 to travel at the same speed as before.

In the situation shown in FIG. 11, in response to detecting the deceleration of the first target object 2 at step 903 and the acceleration of the second target object 3 at step 906, the controller 150 may perform steering control to the vehicle 1 at step 907. In this case, the controller 150 may perform steering control by detecting that the second target object 3 has reached the braking avoidance limit point relative to the first target object 2.

In the case where the first target object 2 decelerates and the second target object 3 accelerates, it may be highly likely that the second target object 3 attempts to avoid collision with the first target object 2 through steering avoidance. Accordingly, unlike an embodiment of FIG. 10, the controller 150 may prevent a collision risk by performing steering control rather than acceleration control or deceleration control. In this case, the controller 150 may further detect a change in the lateral direction of the second target object 3 and perform the steering control to move to the lane in which the first and second target objects 2 and 3 were located or to a lane opposite to the lane. Accordingly, it becomes possible to avoid a collision with the second target object 2.

According to an aspect of the disclosure, the autonomous driving system implemented to perform defensive driving beyond direct collision avoidance is capable of giving passengers a sense of stability and simultaneously preventing an unexpected risk of collision.

Meanwhile, the disclosed embodiments may be implemented in the form of a recording medium storing instructions executable by a computer. The instruction may be stored in the form of a program code, and when executed by a processor, a program module may be generated to perform operations of the disclosed embodiments. The recording medium may be implemented as a computer-readable recording medium.

The computer-readable recording medium includes any type of recording medium in which instructions readable by the computer are stored. For example, there may be a read only memory (ROM), a random access memory (RAM), a magnetic tape, a magnetic disk, a flash memory, an optical data storage device, and the like.

The disclosed embodiments have been described as above with reference to the accompanying drawings. Those skilled in the art will understand that the present disclosure may be implemented in a form different from the disclosed embodiments without changing the technical spirit or essential features of the present disclosure. The disclosed embodiments are illustrative and should not be construed as limiting.

What is claimed is:
1. A vehicle comprising:
   a camera having an external field of view and configured to acquire image data for detecting a target object in the external field of view of the camera;
   a radar having an external field of view from the vehicle and configured to acquire radar data for detecting the target object in the external field of view of the radar; and
   a controller comprising at least one processor and configured to:
      process the image data and the radar data to yield a processing result; and
      control, based on the processing result, at least one of a braking device or a steering device,
   wherein the controller is further configured to:
      detect the target object traveling in a lane adjacent to the vehicle;
      detect an obstacle preceding the target object; and
      perform acceleration control or deceleration control based on detecting acceleration or deceleration of the target object, and
   wherein the controller is further configured to:

determine a braking avoidance limit point of the target object relative to the obstacle; and perform the deceleration control in response to detecting acceleration of the target object after the target object reaches the braking avoidance limit point.

2. The vehicle of claim 1, wherein the controller is further configured to:

perform the deceleration control for the vehicle to maintain at least a predetermined distance from the obstacle; and release, based on detecting the target object in a front field of view, the deceleration control.

3. The vehicle of claim 1, wherein the controller is further configured to:

determine a second braking avoidance limit point of the target object relative to the obstacle; and perform the acceleration control based on detecting deceleration of the target object after the target object reaches the second braking avoidance limit point.

4. The vehicle of claim 3, wherein the controller is further configured to:

perform the acceleration control to move the vehicle ahead of the target object; and release, based on detection of the target object in a rear field of view, the acceleration control.

5. The vehicle of claim 1, wherein the target object is a first target object, and wherein the controller is further configured to:

detect a second target object trailing the first target object in the lane adjacent to the vehicle; and perform the deceleration control based on detecting acceleration of the first target object and acceleration of the second target object.

6. The vehicle of claim 5, wherein the controller is further configured to:

perform the deceleration control for the vehicle to maintain a constant distance from the obstacle; and release, based on detection of the first target object and the second target object in a front field of view, the deceleration control.

7. The vehicle of claim 1, wherein the target object is a first target object, and wherein the controller is further configured to:

detect a second target object trailing the first target object in the lane adjacent to the vehicle; and perform steering control based on detecting deceleration of the first target object and acceleration of the second target object.

8. The vehicle of claim 7, wherein the controller is further configured to perform, based on detecting a change in a lateral direction of the second target object, steering control for the vehicle to move to the lane adjacent to the vehicle or to a lane opposite to the lane adjacent to the vehicle.

9. The vehicle of claim 7, wherein the controller is further configured to perform, after the second target object reaches a braking avoidance limit point relative to the first target object, steering control.

10. A method comprising:

detecting, by processor in a vehicle, a target object traveling in a lane adjacent to the vehicle, and an obstacle preceding the target object; and performing acceleration control or deceleration control based on detecting acceleration or deceleration of the target object, wherein performing of the deceleration control comprises:

determining a braking avoidance limit point of the target object relative to the obstacle; and performing the deceleration control based on detecting acceleration of the target object after the target object reaches the braking avoidance limit point.

11. The method of claim 10, further comprising releasing, based on detecting the target object in a front field of view, the deceleration control, wherein the deceleration control is performed for the vehicle to maintain at least a predetermined distance from the obstacle.

12. The method of claim 10, wherein the performing of the acceleration control comprises:

determining a second braking avoidance limit point of the target object relative to the obstacle; and performing the acceleration control based on detecting deceleration of the target object after the target object reaches the second braking avoidance limit point.

13. The method of claim 12, further comprising releasing, based on detecting the target object in a rear field of view, the acceleration control, wherein the acceleration control is performed to move ahead of the target object.

14. The method of claim 10, wherein the target object is a first target object, and wherein the performing of the deceleration control comprises:

detecting a second target object trailing the first target object in the lane adjacent to the vehicle; and performing the deceleration control based on detecting acceleration of the first target object and acceleration of the second target object.

15. The method of claim 14, further comprising releasing, based on detecting the first target object and the second target object in a front field of view, the deceleration control, wherein the deceleration control is performed for the vehicle to maintain a constant distance from the obstacle.

16. The method of claim 10, wherein the target object is a first target object, and wherein the method further comprises:

detecting a second target object trailing the first target object in the lane adjacent to the vehicle; and performing steering control based on detecting deceleration of the first target object and acceleration of the second target object.

17. The method of claim 16, wherein the performing the steering control comprises steering, based on detecting a change in a lateral direction of the second target object, the vehicle to move to the lane adjacent to the vehicle or to a lane opposite to the lane adjacent to the vehicle.

18. The method of claim 16, wherein the performing the steering control comprises steering after the second target object reaches a braking avoidance limit point relative to the first target object.

19. A vehicle comprising:

a sensor configured to generate sensing data for identifying at least one object;

a processor; and a memory storing at least one instruction that, when executed by the processor communicating with the memory, is configured to cause the vehicle to:

identify, based on the sensing data, a moving object traveling in a lane adjacent to the vehicle;

identify, based on the sensing data, an obstacle preceding the moving object;

determine, based on at least one parameter of the moving object relative to the obstacle, a braking avoidance limit point of the moving object relative to the obstacle; and perform, via autonomous control of the vehicle, one of:

deceleration control based on detecting acceleration of the moving object after the moving object reaches the braking avoidance limit point of the moving object relative to the obstacle; or acceleration control based on detecting deceleration of the moving object after the moving object reaches the braking avoidance limit point of the moving object relative to the obstacle.

20. The vehicle of claim 19, wherein the moving object is a first moving object, and wherein the at least one instruction, when executed by the processor communicating with the memory, is configured to cause the vehicle to:

detect a second moving object trailing the first moving object in the lane adjacent to the vehicle; and perform, via autonomous control of the vehicle, steering control based on detecting deceleration of the first moving object and acceleration of the second moving object.

* * * * *